(12) United States Patent
Zalewski

(10) Patent No.: US 9,183,753 B2
(45) Date of Patent: Nov. 10, 2015

(54) VARIATION AND CONTROL OF SENSORY WORK PLAYBACK

(75) Inventor: Gary Zalewski, Oakland, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 1452 days.

(21) Appl. No.: 11/679,059

(22) Filed: Feb. 26, 2007

(65) Prior Publication Data

US 2008/0206732 A1    Aug. 28, 2008

(51) Int. Cl.
*H04N 9/80* (2006.01)
*G09B 5/06* (2006.01)

(52) U.S. Cl.
CPC .......................................... *G09B 5/06* (2013.01)

(58) Field of Classification Search
CPC .................. H04N 5/913; H04N 2005/91314; H04N 2005/91371; G11B 20/00086; G11B 2220/2545
USPC .......................................................... 386/261
See application file for complete search history.

(56) References Cited

U.S. PATENT DOCUMENTS

| | | |
|---|---|---|
| 3,627,914 A | 12/1971 | Davies |
| 4,425,581 A | 1/1984 | Schweppe et al. |
| 4,979,057 A | 12/1990 | Matsumoto et al. |
| 5,182,640 A | 1/1993 | Takano |
| 5,197,047 A | 3/1993 | Witheridge et al. |
| 5,283,639 A | 2/1994 | Esch et al. |
| 5,410,344 A | 4/1995 | Graves et al. |
| 5,418,622 A | 5/1995 | Takeuchi |
| 5,488,433 A | 1/1996 | Washino et al. |
| 6,339,453 B1 | 1/2002 | Chen et al. |
| 6,362,856 B1 | 3/2002 | Guzik et al. |
| 6,781,638 B1 | 8/2004 | Hayes |
| 6,868,440 B1 | 3/2005 | Gupta et al. |
| 6,947,935 B1 | 9/2005 | Horvitz et al. |
| 6,952,576 B2 | 10/2005 | Fish et al. |
| 6,963,612 B2 | 11/2005 | Haddad |
| 7,006,881 B1 | 2/2006 | Hoffberg et al. |
| 7,260,823 B2 | 8/2007 | Schlack et al. |
| 7,509,178 B2 * | 3/2009 | Logan et al. .................... 700/94 |
| 7,631,330 B1 | 12/2009 | Des Jardins |
| 7,698,236 B2 | 4/2010 | Cox et al. |
| 7,721,310 B2 | 5/2010 | Schaffer et al. |
| 7,735,104 B2 * | 6/2010 | Dow et al. ........................ 725/52 |
| 7,756,388 B2 | 7/2010 | Plastina et al. |
| 7,770,137 B2 * | 8/2010 | Forbes et al. ................. 715/864 |
| 8,046,798 B1 | 10/2011 | Schlack et al. |
| 8,069,466 B2 | 11/2011 | Shelton et al. |
| 8,091,111 B2 | 1/2012 | Logan et al. |
| 8,095,950 B1 | 1/2012 | Lapcevic |
| 8,116,616 B2 | 2/2012 | Plotnick et al. |

(Continued)

FOREIGN PATENT DOCUMENTS

| | | |
|---|---|---|
| JP | 2004-199742 A | 7/2004 |
| JP | 2005051681 A | 2/2005 |

(Continued)

*Primary Examiner* — William C Vaughn, Jr.
*Assistant Examiner* — Daniel Tekle
(74) *Attorney, Agent, or Firm* — Steptoe & Johnson LLP

(57) ABSTRACT

Methods and systems are shown which may enable users to create custom playback schemes for sensory works, including television shows, where a community of users may share thin time-based metadata edit control structures that are processed to enable playback devices to reproduce reference programming material according to the edits or cuts made any user.

43 Claims, 3 Drawing Sheets

(56) References Cited

U.S. PATENT DOCUMENTS

| | | |
|---|---|---|
| 8,321,466 B2 | 11/2012 | Black et al. |
| 2001/0018769 A1 | 8/2001 | Matsui |
| 2002/0083469 A1 | 6/2002 | Jeannin et al. |
| 2002/0116708 A1 | 8/2002 | Morris et al. |
| 2002/0144262 A1 | 10/2002 | Plotnick et al. |
| 2003/0001880 A1 | 1/2003 | Holtz et al. |
| 2003/0014768 A1 | 1/2003 | Ishihara |
| 2003/0093790 A1 | 5/2003 | Logan et al. |
| 2003/0215209 A1 | 11/2003 | Kawaguchi |
| 2004/0012717 A1 | 1/2004 | Sprague et al. |
| 2004/0073924 A1 | 4/2004 | Pendakur |
| 2004/0117819 A1 | 6/2004 | Yu |
| 2004/0268384 A1 | 12/2004 | Stone |
| 2005/0025249 A1 | 2/2005 | Zhao et al. |
| 2005/0060229 A1 | 3/2005 | Riedl et al. |
| 2005/0102695 A1 | 5/2005 | Musser, Jr. |
| 2005/0132295 A1 | 6/2005 | Noll et al. |
| 2005/0204385 A1* | 9/2005 | Sull et al. ............ 725/45 |
| 2005/0210502 A1 | 9/2005 | Flickinger et al. |
| 2005/0259959 A1 | 11/2005 | Nagao et al. |
| 2005/0283796 A1 | 12/2005 | Flickinger |
| 2006/0059535 A1 | 3/2006 | D'Avello |
| 2006/0143236 A1 | 6/2006 | Wu |
| 2006/0222319 A1* | 10/2006 | Russ ................ 386/52 |
| 2006/0280437 A1* | 12/2006 | Logan et al. ............ 386/94 |
| 2007/0041707 A1 | 2/2007 | Edmunds |
| 2007/0156739 A1* | 7/2007 | Black et al. ............ 707/102 |
| 2007/0206949 A1 | 9/2007 | Mortensen |
| 2007/0260677 A1 | 11/2007 | DeMarco et al. |
| 2008/0040740 A1 | 2/2008 | Plotnick et al. |
| 2008/0060001 A1 | 3/2008 | Logan et al. |
| 2008/0118062 A1 | 5/2008 | Radivojevic et al. |
| 2008/0152300 A1* | 6/2008 | Knee et al. ............ 386/68 |
| 2008/0155589 A1 | 6/2008 | McKinnon et al. |
| 2008/0307454 A1 | 12/2008 | Ahanger et al. |
| 2009/0093278 A1 | 4/2009 | Negron et al. |
| 2010/0103324 A1 | 4/2010 | Maegawa |
| 2010/0125882 A1 | 5/2010 | Athias |
| 2011/0173655 A1 | 7/2011 | Blumenschein et al. |

FOREIGN PATENT DOCUMENTS

| | | |
|---|---|---|
| JP | 2005260748 A | 9/2005 |
| WO | WO0135410 | 5/2001 |
| WO | 01/67756 A2 | 9/2001 |

* cited by examiner

VARIATION AND CONTROL OF SENSORY WORK PLAYBACK

CROSS REFERENCE TO RELATED APPLICATIONS

This application is related to co-pending U.S. patent application Ser. No. 12/631,108 filed on Dec. 4, 2009, entitled "NETWORK MEDIA PLAYER WITH USER GENERATED PLAYBACK CONTROL;" co-pending U.S. patent application Ser. No. 12/631,132 filed on Dec. 4, 2009, entitled "SOCIAL NETWORK-DRIVEN MEDIA PLAYER SYSTEM AND METHOD;" co-pending U.S. patent application Ser. No. 12/631,158 filed on Dec. 4, 2009, entitled "NETWORK MEDIA PLAYER AND OVERLAY FEATURE;" and co-pending U.S. patent application Ser. No. 12/631,171 filed on Dec. 4, 2009, entitled "MEDIA PLAYER WITH NETWORKED PLAYBACK CONTROL AND ADVERTISEMENT INSERTION."

TECHNICAL FIELD

Briefly, and in general terms, this disclosure relates to the creation, use, and/or sharing of metadata and the like to control or vary the playback of a sensory work.

BACKGROUND

Personal Video Recorders (PVRs) have revolutionized the way many consumers watch television. Similar to a video cassette recorder (VCR), a PVR allows a user to record shows for viewing at a later time; however, PVRs offer many additional features including the ability to pause and rewind a live television broadcast.

With many cable companies and satellite providers offering over 100 channels of programming, it can be a daunting task to find the programming that a subscriber would like to watch. Many PVRs offer ways to manage or reduce complexity. For example, a PVR may allow subscribers to record shows by title whenever they are shown so that a subscriber does not need to be concerned when a favorite program moves from Monday night to Thursday night. Some PVRs allow programs to be recorded by categories and/or keywords. For example, this allows someone interested in remodeling a bathroom to record home improvement television programs with "bathroom" in their title description.

PVRs reduce the complexity and improve the ability to record shows that a subscriber desires to watch; however, PVR functionality stops there. Once a subscriber has recorded shows, they can be played back, paused, fast forwarded, rewound, and the like; however, the viewer typically manually controls this functionality.

Television programs are recorded on PVRs (and otherwise) by individuals with different tastes, preferences, purposes, and the like For example, one person may record the Super Bowl to watch football, while another may record it to watch the pre-game and half-time programming, and another may record it to watch new commercials. Each of these individuals, using a conventional PVR would desire to playback the show in a different manner.

It is desirable to provide a mechanism to create, use, and/or share different playbacks of television programs and other sensory works. For example, it is desirable to provide an individual who has recorded the Super Bowl only to watch the commercials with the ability to playback his recording of the Super Bowl on his PVR such that only the commercials are shown. Similarly, an individual who has recorded the Super Bowl only for the football may desire to only see each football play during playback.

This disclosure discusses techniques and systems that may be used to create metadata or the like that controls, interprets, translates or varies the playback of a sensory work, such as, a television program.

SUMMARY

In one general aspect, a sensory work playback system includes a sensory work input port operable to receive sensory work data, a storage device for storing a playback control record setting forth alterations to the playback of the sensory work data, a sensory work output port operable to send information to a sensory output device to enable the playback of sensory work data, and a processor operable to alter the playback of sensory work data by outputting altered sensory work data through the sensory work output port. The playback control record may include a sensory work applicability identifier usable to determine whether the playback control record is applicable to a sensory work, a frame of reference, and at least one variation encoding defining an alteration to be applied to the playback of a sensory work relative to the frame of reference.

In some implementations, the sensory work data includes audio-visual information, such as, for example, television programs, movies, video games, and the like. This sensory work data may be stored on a computer-readable medium, which may be removable. The sensory work data may also be mixed with time-based control data or program instruction and/or streamed over communication channels to the playback device. In addition, the playback control record may be stored in a memory.

In one implementation of the sensory work playback system, the processor is operable to alter the playback of sensory work data by outputting altered sensory work data through the sensory work output port, such as, for example, by skipping at least one segment of the sensory work, reordering segments, overlaying information, changing playback speed, inserting a segment, and the like. The playback control record may be represented in any fixed or dynamic format, including those based in metadata. Both the playback control record input port and the sensory work output port may be implemented using an input/output controller.

The sensory work playback system may be embodied as a digital video recorder or enabled feature therein. The playback system may reside at the user location, on a network or combination thereof. Further, the playback system may be formed of parts that perform functions on different devices. The parts may reside on consumer electronic devices coupled to the TV, on devices in the home, including the PC or network devices coupled to a home network. Functions of the playback system may also be provided at remote locations, in a peer network, service provider or cable network, etc.

In another general aspect, a playback control record stored on a computer-readable medium includes a sensory work applicability identifier usable to determine whether the playback control record is applicable to a sensory work, a frame of reference (which may be implicit), and at least one variation encoding defining an alteration to be applied to the playback of a sensory work relative to the frame of reference. The playback control record is typically processed by a sensory work playback device or intermediary device so causing playback to be altered according to the schemes presented hereunder.

The sensory work applicability identifier may be implemented in a variety of ways. For example, a program, a program identifier, a format identifier, a source identifier may be coupled to or related with a sensory work to identify the sensory work. In addition to identifying the sensory work itself, the identifier may include a scheme to define the format, length and other programming data for initializing, synchronize, decrypting the sensory work. This may be done by the sensory playback device, by coupled network devices or by combination thereof. In addition, the sensory work applicability identifier may be hierarchical in nature.

In some implementations, the frame of reference is event-based and/or time-based. For example, the frame of reference may be implemented by defining a reference occurrence, such as, for example, a particular frame whose occurrence identifies epoch time $t_0$, a particular frame sequence whose occurrence identifies epoch time $t_0$, a calculated value such that calculations may be performed using sensory work data and the results compared to the calculated value to identify epoch time $t_0$, or the like.

Variation encodings may be implemented by including a temporal identifier (such as, for example, a time t relative to the frame of reference), together with an alteration description. The alteration description may include, by way of example and not by way of limitation, one or more from the group consisting of: a deletion; a reordering; an insertion; an overlay; and a modification.

In another general aspect, one method for altering the playback of a sensory work includes receiving a playback control record, receiving some, all, or a portion of a sensory work, altering the sensory work based on the playback control record, and outputting data to facilitate the playback of the altered sensory work by a sensory work playback device.

In some implementations, receiving a playback control record includes receiving a sensory work applicability identifier usable to determine whether the playback control record is applicable to a sensory work, a frame of reference, and at least one variation encoding defining an alteration to be applied to the playback of a sensory work relative to the frame of reference.

In another general aspect, software stored on a computer-readable medium includes a code segment to access a playback control record, a code segment to read a sensory work, a code segment to alter the sensory work based on the playback control record, and a code segment to output data to facilitate the playback of the altered sensory work by a sensory work playback device.

In another general aspect, a device operable to control sensory work playback includes a storage device for storing a playback control record setting forth alterations to the playback of a sensory work, logic for generating at least one control signal based on the playback control record, and a control signal port operable to output the at least one control signal to vary the behavior of a sensory work playback device. The playback control record includes a frame of reference (which may be implicit), and at least one variation encoding defining an alteration to be applied to the playback of a sensory work relative to the frame of reference.

In some implementations, each variation encoding includes a temporal identifier (which may be implicit) relative to the frame of reference, and an alteration description (such as, for example, a control function and a duration). The alteration description may be used to define functions, such as, for example, play, stop, fast-forward, rewind, pause, and the like.

The control signal port is operable to output control signals to vary the behavior of a sensory work playback device. In some implementations, this is done by sending infrared (IR) control signals through an IR blaster.

In another general aspect, a method for controlling a sensory work playback device includes receiving a playback control record associated with a sensory work, and outputting at least one control signal to alter the playback of the sensory work based on the received playback control record, such as, for example, outputting a signal usable by an infrared (IR) blaster to control a sensory work playback device.

In another general aspect, a method for providing control of sensory work playback includes storing at least one playback control record setting forth alterations to the playback of a sensory work, receiving a playback control record request across a computer network, and submitting a playback control record in response to the received request. The playback control record is usable by a sensory work playback device to alter the playback of a sensory work. Sensory work playback records may be stored in a database or the like, such that received requests for playback control records may be submitted as database queries. In response to a received request, the system may submit one or more playback control records.

Some implementations further include receiving a playback control record and storing the received playback control record with the at least one playback control record. Techniques such as those described above may be used to provide a collaborative sensory work playback control system.

The details of one or more implementations are set forth in the accompanying drawings and the description below. Other features and advantages will be apparent from the description and drawings, and from the claims.

DETAILED DESCRIPTION

Figure 1:
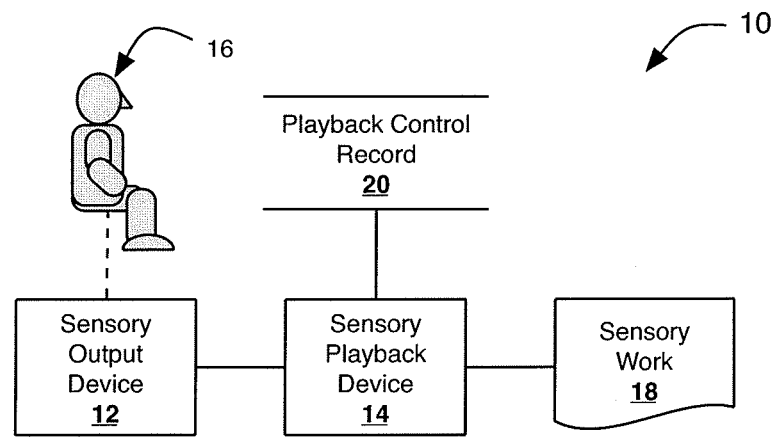
FIG. 1 is a diagram of a sensory work playback system.

Referring to FIG. 1, a sensory work playback system 10 includes at least one sensory work output device 12 coupled to a sensory playback device 14 such that the sensory output device 12 is operable to stimulate at least one of a stimulatory experient's 16 senses by varying the playback of a sensory work 18 based on a playback control record 20. For purposes of this disclosure, a stimulatory experient 16 is one whose senses are stimulated by a sensory output device 12. The sensory playback device 14 is operable to control or vary the playback of the sensory work 18 based on a playback control record 20.

A sensory work output device 12 is any apparatus operable to stimulate at least one sense of a stimulatory experient 16, whether by electrical, mechanical, chemical, thermal, and/or biological mechanisms. By way of example, and not by way of limitation, sensory work output devices 12 include the following and the like: video display devices, such as televisions, monitors, display panels, whether standalone or embedded (e.g., a mobile telephone display, a portable DVD player, or a handheld video game unit); audio devices, such as speakers, headsets, and earphones; and tactile devices, such as virtual reality gloves, automated massage chairs, computer-controlled exercise equipment, simulators (e.g., flight simulators, firearm training simulators, driving simulators, and the like), and haptic devices (e.g., video game controllers). One skilled in the art will appreciate that the devices, systems, and techniques described herein are widely applicable to existing and future sensory work output technologies.

A sensory playback device 14 is any device operable to control a sensory work output device 12. By way of example, and not by way of limitation, sensory playback device 14 may be embodied as a digital video recorder (DVR), video cassette recorder, digital entertainment center, cable box, computer, radio (either terrestrial or satellite), cassette player, digital music player, CD player, DVD player, Blu-ray Disc player, automated massage chair, electronically controlled exercise devices, personal digital assistants (PDAs), digital book viewing devices, and the like.

The most common sensory works 18 in use today include audio recordings and motion pictures. However, as used herein, sensory work 18 refers to any work fixed in a tangible form of expression usable by sensory playback device 14 to stimulate at least one sense of a stimulatory experient 16, whether by electrical, mechanical, chemical, thermal, and/or biological mechanisms. It should be stated that any work "fixed" in tangible form may include dynamic content and blog material. Such material may be considered "fixed" with respect to the state and/or the content of the video blog at any instant of time; however, the inventor recognizes that the present invention may be used to control playback of such dynamic community content, including video or blog content.

The following sensory works 18, provided for purposes of explanation, are not intended to be limiting:

1. Motion Pictures and Television Programs. Audiovisual works such as movies and television shows may be obtained from many sources. For example, they may be purchased or rented on Blu-ray Discs, DVDs, video tapes, Universal Media Discs (UMDs), and the like. In addition, they may be watched or recorded from cable, satellite, or over-the-air broadcasts, and stored for later playback. Also, they may be streamed or downloaded over a data network.

2. Music and Audio Books. Audio recordings of music and audio books are commonly available for purchase on tapes, CDs, DVDs, UMDs, Blu-ray Discs, and the like. Additionally, music and audio books may be streamed or downloaded using a data network. Finally, music and audio programming is commonly broadcast by radio stations, satellite radio companies, and by various entities on the Internet. Audio data may be stored in a wide variety of formats, such as, for example, Audio CD format, MPEG-1 Audio Layer 3 (MP3) format, Advanced Audio Coding (AAC) format, and the like.

3. Video "Blogs", such as those available via networks such as YouTube™, etc.

4. Digital Books. Books may now be purchased entirely in electronic format for use on a computer, personal digital assistant (PDA), or an electronic device designed for this purpose. Images of pages in the digital book are displayed such that a reader may read just as with a conventional printed book, with certain added abilities to search, bookmark, annotate, and the like.

5. Internet. The Internet provides a source of a wide-variety of static and dynamic data. It may be desirable to vary a user's interaction with Internet websites and downloaded data based on defined metadata.

6. Emerging and New Formats & Technologies. Various new electrical and/or mechanical devices that now support or could foreseeably support the playback of sensory works 18 have emerged. For example, amusement rides, robotic massage chairs, laser light show devices, electronically-controlled holiday lighting, video game systems, simulators, and the like.

One skilled in the art will appreciate that the systems and techniques described herein are applicable to any sensory work 18 including those that stimulate one's senses of sight, smell, taste, touch, or hearing, and, those that operate on biofeedback, any combination thereof.

Playback Control Records

Playback control records 20 include various data usable by a sensory playback device 14 to vary or control the playback of a sensory work 18. One skilled in the art will appreciate that playback control records 20 may be represented and stored using any conventional data storage and data access techniques. For example, one implementation of a sensory work playback system 10 uses playback control records 20 remotely stored on a server in XML format and transmitted to a sensory playback device 14 as necessary to vary or control the playback of a sensory work 18. Playback control records 20 may include one or more of the following elements: playback variation & control operations; identification of a sensory work 18; and/or a frame of reference. Also, playback control records 20 may include whatever additional information may be desired for a particular embodiment. For example, some embodiments use playback control records 20 having a title, an author, a creation date, and the like.

Playback Variation & Control Operations

This section discusses the various operations that may be applied to vary or control the playback of a sensory work 18.

Deletion

It may be desirable to delete or skip certain segments of a sensory work 18. For example, some viewers of a movie or television program may desire to skip commercials and/or unwanted content for a wide variety of reasons, including a desire to remove content believed to be harmful, inappropriate, or otherwise undesirable; to remove content immaterial or unimportant for a particular viewer's purposes or uses; or to remove content of a lesser priority.

Consider, for example, a viewer who records the television program "Survivor" on his or her PVR. If the viewer is able to watch the program every week, he or she may desire to see the entire program (except for the commercials); however, if the viewer misses a couple of programs, he may be less interested in seeing the entire program for all but the most recent showing and simply catch the highlights, such that they can watch the most recent broadcast in full. Based on the particular viewer's needs and/or purposes, different portions of the broadcast would be desirable to skip over or be deleted during playback.

For another example, consider a user who has recorded the Academy Awards, a broadcast that attracts the interest of many different groups of viewers. Viewers recording this event may be interested in celebrities; entertainment news; movies; a particular actor, actress, screenwriter, director, and/or movie; musical entertainment; and the like. Different groups of viewers may prefer to watch different portions of the broadcast. Thus, it is desirable to delete or skip portions of the broadcast to provide a custom viewing experience for each group.

Reordering

In some instances, it may be desirable to view or experience certain segments of a sensory work 18 in a different order than that intended by the broadcaster, producer, and/or author.

For example, when listening to music, groups of listeners may wish to play music tracks in a different order than they appear on an album. It is desirable to reorder the playback of segment of a sensory work 18.

Overlaying

In some instances, it may be desirable to overlay information during the playback of a sensory work 18.

For example, if a website providing metadata or the like to vary the playback and/or control of a television program publishes such information such that users may access the metadata to collapse or delete content that they do not wish to see, that website may wish to insert advertising data by overlaying a mark, brand, or other identifier during playback.

Additionally, it may be desirable to insert custom screen tickers, product placements, subtitles, dubbing, images, and the like during playback for a wide variety of reasons.

Playback Speed

In some instances, it may be desirable to vary the playback speed of certain segments of a sensory work 18.

For example, advertisers have found that many PVR users fast-forward through commercials. Some innovative advertisers have incorporated 1-second segments within broadcasts that are effectively only usable by PVR users who pause playback to view the content. It may be desirable to vary playback such that portions of a broadcast are shown paused for a few seconds, shown in slow motion, or shown in fast forward motion, depending on the circumstances.

Additionally, it may be useful to be able to create custom "instant replays" during the playback of a sporting event (or any other program). This would allow, for example, a user to create metadata such that a certain play in a football game would be viewed in slow motion.

Insertion

In some instances, it may be desirable to insert additional information, video, audio, and the like, during the playback of a sensory work 18.

For example, a user may desire to insert media from another source, from another segment within the same source, or to insert new data. One implementation of this technique would be to insert profile-based advertising during playback. For example, during the playback of the Super Bowl, viewers may be shown advertisements based on demographics or any other information available. Thus, viewers living within one census block group may be shown a Lexus advertisement, while those in another census block group may be shown a Toyota advertisement.

Additionally, this technique may be used to add information to a program to create a new program commenting on it, or to otherwise create a derivative work. For example, playback of a broadcast of the State of the Union may be modified by inserting commentary or additional footage. Additionally, playback may be modified for satirical or comedic purposes.

Presentation

In some instances, it may be desirable to modify the presentation of the sensory work 18. For example, one viewer may choose to present a colorized movie in the original black and white version or vice versa. Similarly, other aspects of the display and presentation are allowed to suit the viewer's preferences.

Other

The implementations discussed above are provided for purposes of example only. One skilled in the art will appreciate that any variations, modifications, and/or control of the playback of a sensory work 18 is within the scope of this disclosure.

Metadata

Any modification to a sensory work 18, such as those variations and/or controls mentioned above, may be stored or conceptualized as metadata or other similar control data related to a particular sensory work 18. Metadata as used herein means any control signal or data capable of performing the desired function.

Identification of Sensory Work

Metadata affecting the playback variation and/or control of a sensory work 18 would preferably be associated with a particular sensory work 18 and/or a particular instance of a sensory work 18. For example, a television program broadcast on NBC-affiliate WRC-TV in Washington, D.C. may show different advertisements than NBC-affiliate KNTV in San Francisco. Additionally, a show may be broadcast in different formats, such as Standard Definition (SD) and High-Definition (HD). It is desirable to associate metadata with sensory works 18 to which the metadata is applicable.

In one implementation, metadata includes a program identifier. For example, the program identifier may be "Super Bowl XL". This technique may be suitable for most purposes; however, when there are variations between sources, it may be more desirable to provide separate identifiers for each source (e.g., "Super Bowl XL:DirecTV", "SuperBowl XL:Comcast", "SuperBowl XL:WRC-TV", and the like).

In an implementation applying metadata to a movie, the movie may be available to a viewer who records the movie from broadcast television, from pay-per-view, who plays the movie from DVD, or who obtains the movie across the Internet through a video-on-demand system. Because there may be variations between each broadcast (i.e., some may be edited to fit the screen, some may be shown in widescreen, some may have commercials, and the like), it may be useful to provide an identification of the movie that takes these differences into account.

One possible solution to this problem is to provide a hierarchical representation. For example, there may be a broad class entitled "Super Bowl XL" with more specific instances for different sources. This solution would allow someone who has obtained video from any source to use the broadest class and to use a more specific instance of metadata when available.

Sometimes, a sensory work 18 may be provided with metadata to control playback. When the relationship between metadata and a particular sensory work is implicit, there is no need for any reference to applicable sensory works 18.

Frame of Reference

Once a user has a sensory work 18 and metadata to control or vary playback, it is useful to determine a common frame of reference. When sensory works 18 are identical or substantially identical, a frame of reference may be implicit; however, when there are substantial variations between sensory work 18 sources, it may be useful to provide some synchronization such that the appropriate information is deleted, inserted, reordered, fast forwarded, or otherwise modified or controlled.

There are at least two kinds of sensory works 18: (i) those that are temporally well-behaved; and (ii) those that are not. A sensory work 18 is temporally well-behaved if each playback is relatively coincident in time. For example, movies and audio recordings are temporally well-behaved because the occurrence of each video and/or audio frame is at substantially the same relative moment during playback (i.e., the same note is played at approximately the same relative point in time).

For temporally well-behaved sensory works 18, a frame of reference may be created in time by identifying epoch time $t_0$ and associating this time with the playback of the sensory work 18. The kind of association used will depend on the nature of the sensory work 18. For example, for an audio sensory work 18, the frame of reference may be a waveform, such that a sensory playback device 14 may identify the waveform during playback and, and thus associate epoch time $t_0$ with the matched waveform.

In some instances, matching a single frame may be insufficient because that frame, or one substantially similar, may occur over and over. There are many techniques known in the art for identifying video and/or audio recordings. For example, various video fingerprinting technologies could be employed to identify characteristics of a sensory work 18 that are statistically improbable to occur elsewhere. Such a characteristic may be used to define the epoch time $t_0$ either directly or as an offset to the reference characteristic.

Once a common frame of reference is established, variations and control operations defined by a playback control record 20 may be applied at a defined instance relative to epoch time $t_0$.

Some sensory works 18 are not temporally well-behaved, for example, playback may not be deterministic, playback may vary, or playback may be affected by various external influences. For such a sensory work 18, a playback control record 20 may define variation and control operations relative to events. For example, a playback control record 20 may be created to modify or vary a video game sensory work 18. Because video game play is highly dependent on user interactions, it may be more effective to define variation and control operations based on the occurrence of one or more events instead of the lapse of a predetermined amount of time.

One way to determine a common frame of reference is to set an arbitrary or best guess initial frame of reference and to allow the viewer or user to fine tune playback to account for any differences. For example, it may be assumed that the metadata references an identical copy of the sensory work 18. If insertions, deletions, and the like are being made at inappropriate times, the user may vary playback (such as, for example, by slowing or speeding playback relative to the metadata control, or by skipping frames forwards or backwards relative to the metadata control) to achieve the desired results.

Variation Encoding

One skilled in the art will appreciate that there are countless ways to encode such variations and control of the playback of a sensory work 18. In a preferred embodiment, metadata includes time references with relation to an identified frame of reference. For example, the metadata may provide that the initial 2 minutes 23 seconds from the frame of reference are played and then the next 58 seconds are skipped. The metadata may then indicate, for example, that other data is then inserted with certain other information overlayed for the next 30 seconds, and so on.

Figure 2:
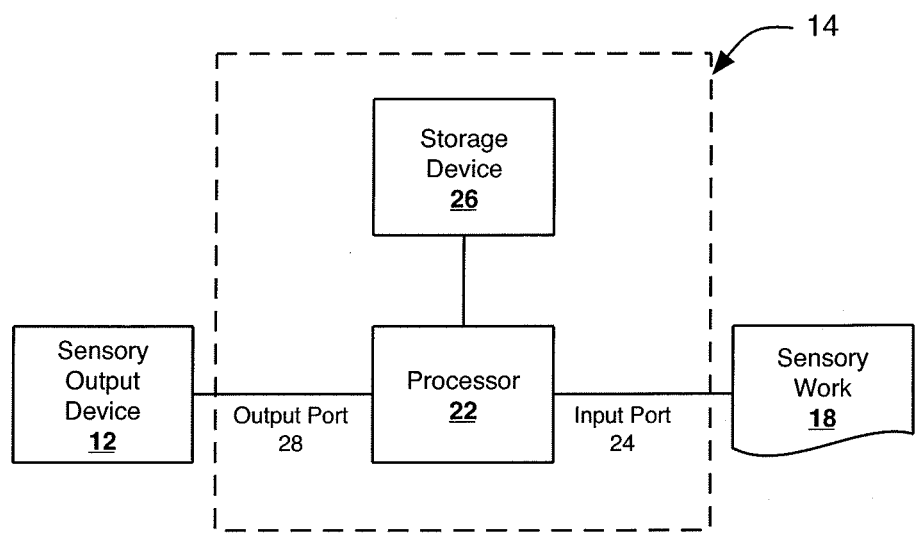
FIG. 2 is a diagram of a sensory work playback device.

Referring to FIG. 2, a sensory playback device 14 includes a processor 22 having a sensory work input port 24 operable to receive a sensory work 18, a storage device 26 for storing a playback control record 20, and a sensory work output port 28 operable to send information to a sensory output device 12 to enable the playback of a sensory work 18. As used herein, "port" is meant to include any device or mechanism by which the sensory playback device 14 may input or output data.

Figure 3:
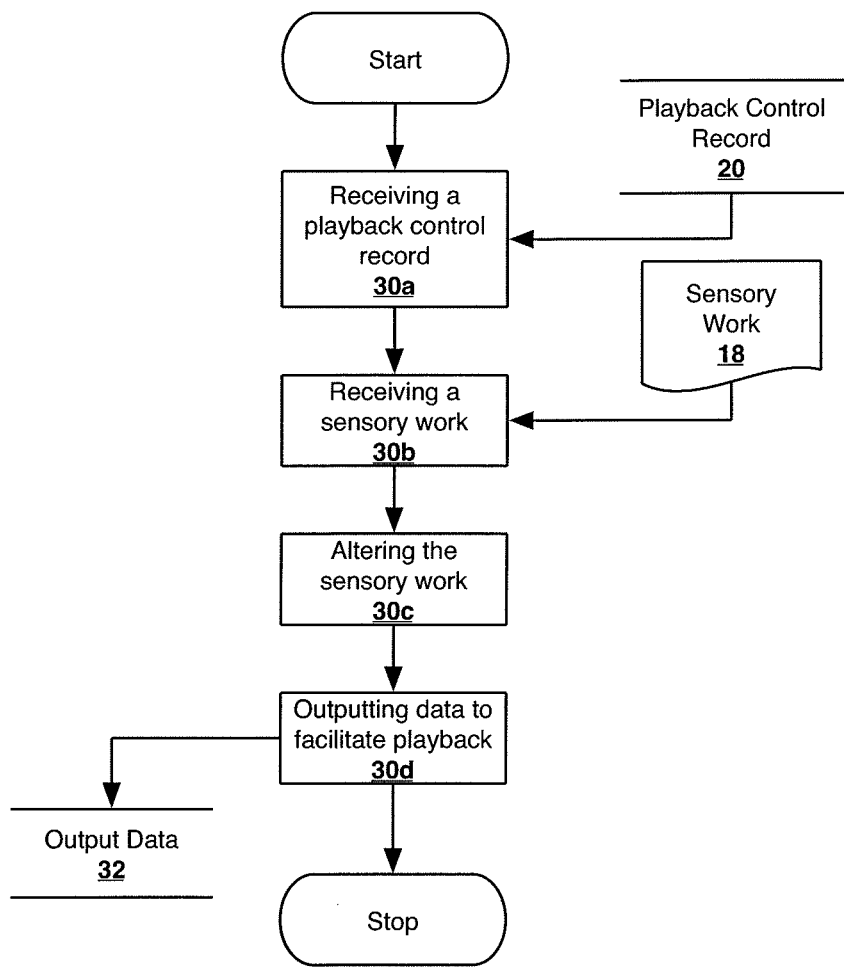
FIG. 3 is a flow chart of method for altering the playback of a sensory work.

Referring to FIG. 3, a method for altering the playback of a sensory work includes receiving a playback control record 20 (step 30*a*), receiving a sensory work 18 (step 30*b*), altering the sensory work 18 based on the playback control record 20 (step 30*c*), and outputting data 32 to facilitate altered playback of the sensory work 18 (step 30*d*).

Community

A plurality of users forms a "Community." Within the Community, the users have access to the sensory work 18, such as, for example, an audio recording, a movie, television show, and a work with tactile elements, light show, and the like. The sensory work may be of any form and from virtually any source. In addition, a user can have access to the metadata created by another user within the community.

More particularly, and by way of example and not by way of limitation, users within the Community have access to a sensory work. For example, users may have access to the most recent Super Bowl game footage. This game footage may be provided for access such that each user has the same sensory work or a copy of the same sensory work, or users may obtain the sensory work through other means (e.g., from broadcast television, cable, Internet, or satellite). Users within the Community can create metadata to vary the playback of the game, for example, a user may create a Cliff note version of the recent Super Bowl game footage to tailor such footage to their needs and/or desires. For example, one user may tailor the footage so that only the "snaps" for the entire game are included within the Cliff note version. In this way, the user can view the entire series of plays within the game without all the extraneous material unrelated to such plays. Thereafter, other users can access this version or Cliff note of the media and amend it to their needs or desires. For example, another user may use this version relating to all snaps within the game, but also add in the half-time show. In this way, users within the Community can collaborate with one another, express their opinions, or merely enjoy the creations of others on related themes. The community further provides for users to vote on various Cliff note versions, to interact with other members of the Community, and to express their interest and preferences. Such interests and preferences may be tracked and used to provide "user-specific" information to the Community or particular users within the Community. Finally, the summary nature of the Cliff note version allows users to view lengthy amounts of data within a short time period, if desired.

In another embodiment, the Cliff note versions may be supplemented with additional material from third parties relating to the Cliff note version. For example, advertisers may be able to insert advertisements within the Cliff note version that are tailored to the needs and/or desires of the user creating or modifying the Cliff note version.

In practice, each user within the Community will have access to a segment of media or data. This data or media can be sourced from TIVO, television, the Internet, or any other source. Thereafter, the system will normalize the segments of the users to determine a common starting point for all the segments provided amongst the users. This step is required since it is difficult to know where each user's segment begins due to the multiple sources of data. Once such starting point is determined for all users, reference points contained within the data or media may then be used to provide the beginning and end points for the Cliff note version of the data/media. Rather than send the entire media file, in a preferred embodiment, only the reference points are shared amongst the users within the community. This provides for accurate editing capabilities, enhanced transfer speeds and minimizes bandwidth issues. Further, the use of reference points makes insertion of data from third parties easier.

Normalization of a sensory work may be performed in various ways. For example, in some implementations, the first metadata reference point includes a fingerprint for a reference frame. This fingerprint may be taken performing calculations based on a single frame or a segment of frames. Any technique may be used to generate the fingerprint such that a user or the user's system may determine the reference used to create the metadata.

Once a Community is established and users have the desired segment of data or media, a user interface allows one or more of the users to access their segment and to create a Cliff note version of the data. The first time the specific data or media is accessed, the user is asked whether they wish to create a Cliff note version. Once a first version of the Cliff note is created, the reference points for such Cliff note version may be stored in a database and accessed by other users within the Community. The other users may access the Cliff note version, view it, modify it, add or delete data to it, and the like. Further, the community can vote on the best version, discuss the various versions, and the like. Awards or prizes may be associated with the versions and provided and determined by third parties and/or members within the Community.

Such a system, as described above, provides an enhanced and creative environment for users to join together with common interests and to individually or jointly develop creative works or summaries of data or media common to or associated amongst all the users. This provides not only excitement and amusement, but also a forum to express ideas and interest. Such an environment further provides for a means to track user interest and preferences so that the Community and/or third parties can track and provide information that is tailored to the users and the Community within the data and media.

In one implementation, a collaborative community facilitates the creation, sharing, and use of metadata to control or vary the playback of a sensory work. In this particular example, the community is supported by the insertion of profile-based advertising during the playback of the sensory data.

The system provides a mechanism to assist users in identifying the "best" contributed metadata for their purposes. For example, one mechanism that may be used is to allow users to rate metadata contributions.

Some implementations enable profile-based advertisement swaps such that targeted advertisements may be inserted during playback of sensory data. To determine which advertisement to insert, the system may use any available information, such as, for example, user preferences, account data, census data, demographics, user ratings, past participation in the community, and the like.

IR Blaster Embodiment

The techniques described above may be incorporated in a wide-variety of consumer electronics products including electronic music players (e.g., MP3 players, iPods, and the like, DVRs, personal computers, and the like). However, these techniques may also be used with legacy consumer electronics equipment.

Consider, for example, a consumer electronics control device operable to control or vary the playback of a consumer electronics playback device. For example, the control device may include an IR blaster, serial connection, network connection, and the like, operable to control a VCR, DVR, DVD player, or any other consumer electronic playback device. In the IR blaster implementation, the consumer electronics control device is operable to read metadata related to the playback of a particular sensory work 18 and to vary or control the playback through a consumer electronics playback device by sending signals using the IR blaster.

For example, metadata associated with Super Bow XL may identify a frame of reference and state to skip the 56 second segment beginning 7 minutes 15 seconds from the frame of reference. To do this, the consumer electronics control device can initiate a fast-forward operation at the 7 minutes 15 seconds point until the 56 second segment is complete.

In some implementations, the IR blaster may be able to simply request a 56 second skip; however, for some devices (such as VCRs) the consumer electronics control device may need information regarding the speed with which the consumer electronics playback device fast forwards.

Some implementations maintain a table storing the fast-forward and rewind-rates of various playback devices, along with latency times so that the consumer electronics control device can accurately perform variations and controls functions specified by the metadata.

Digital Video Recorder Embodiment

Figure 4:
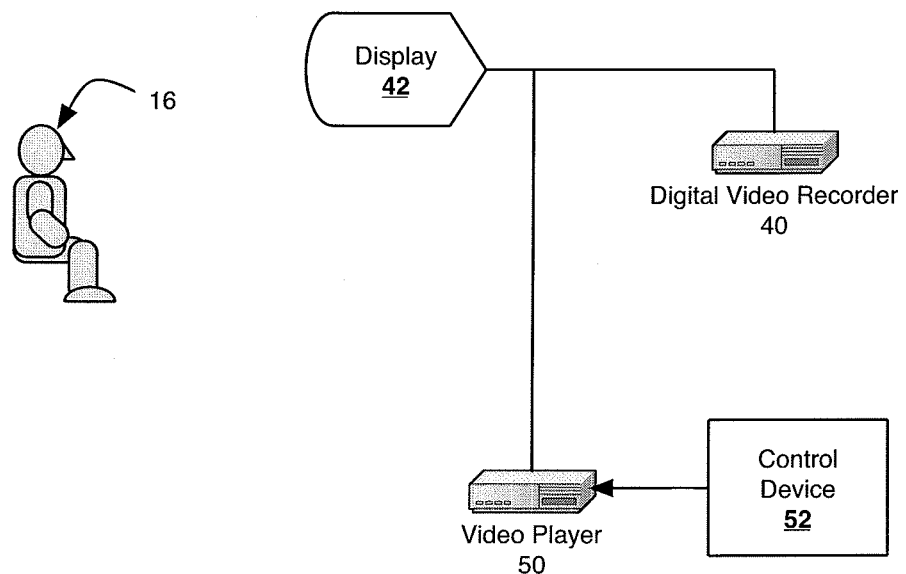
FIG. 4 is a diagram of a digital video recorder implementation and a legacy video player implementation of a sensory work playback system.

FIG. 4 is a diagram of implementations of sensory work playback systems 10 for varying and/or controlling the playback of video recordings for viewing by a stimulatory experient 16. In one implementation, a digital video recorder 40 is coupled to a display 42. The digital video recorder 40 is operable to perform operations such as those performed by conventional digital video recorders; however, the digital video recorder 40 is augmented support the variation and control of playback.

In some implementations, the digital video recorder 40 is operable to receive a playback control record 20 from an external source, such as, across a data network, from computer-readable media, or by user input. A playback record may be stored in a memory on the digital video recorder 40 and enabled to alter playback. For example, a stimulatory experient 16 who has recorded a television broadcast program may download a playback control record 20 associated with that television broadcast program such that he or she may view the program, skipping over commercials (e.g., by fast forwarding through them, by jumping over them, or the like).

Some consumers do not have digital video recorders 40 that can be updated to support the concepts disclosed herein because they are using legacy hardware that is not upgradeable. For those consumers, such as owners of conventional video cassette recorders, their legacy video player 50 may be used with a control device 52. The control device 52 may use a variety of techniques to control the video player 50, such as, for example, the IR blaster techniques discussed above. For these consumers, the control device 52 may be unable to determine information regarding the video being played. In such case, the control device 52 may rely on a stimulatory experient 16 to identify an appropriate playback control record 20 and to synchronize the execution of the playback control record 20 with video playback. For example, in some implementations, the control device 52 is configured to control a program loaded into video player 50. The stimulatory experient 16 operates the video player 50 to begin play and then initiates control by the control device 52.

The control device 52 may include a user interface to enable tracking relative to the current playback. For example, if the control device 52 signals the video player 50 to fast-forward through a commercial or a program segment too early, then the stimulatory experient 16 may use the interface relatively slow or speed control in order to synchronize the devices.

Figure 5:
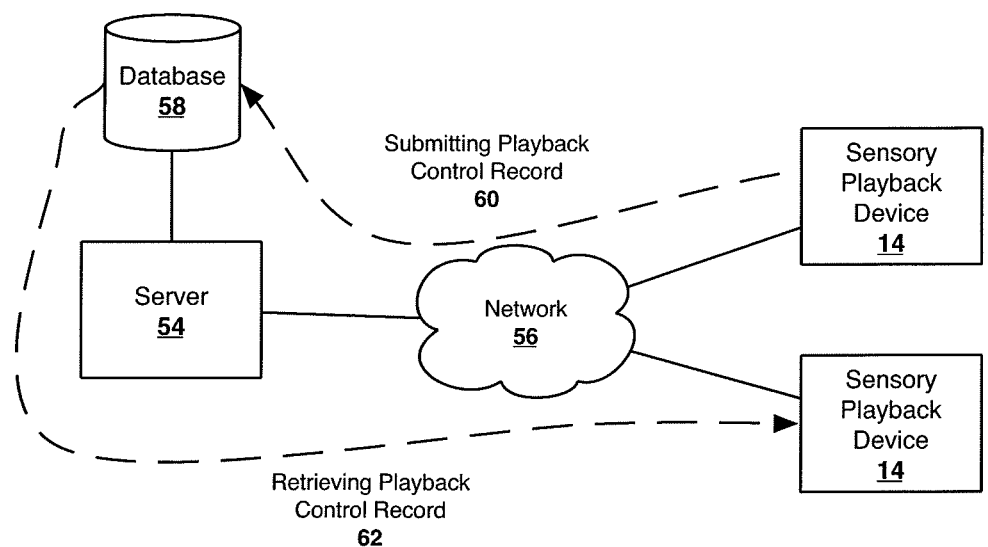
FIG. 5 is a diagram of a collaborative sensory work playback system.

Referring to FIG. 5, a collaborative sensory work playback system includes a server 54 coupled to a network 56, such as, for example, the Internet, a wide area network, a local area network, or the like. The server 54 operates in conjunction with a database 58 to enable the exchange of playback control records 20. Any database or data storage techniques may be used such that one or more sensory playback devices 14 may interact with the server 54 to submit playback control records 60 or retrieve playback control records 62.

This implementation of a collaborative sensory work playback system may be used, for example, to enable an online community for sharing playback control records 20. Any of the techniques described above may be used in this system. For example, a user in one household having a DVR sensory playback device 14 may record a television program on the DVR and create a playback control record 20 that varies the playback of a recorded sensory work, and submit the playback control record 60 the server 54. The playback control record 20 is stored in database 58. Another user, such as, for example, a user in another household, may be use an enabled DVR sensory playback device 14 and search, using server 54, to find any playback control records 20 applicable to a particular sensory work 18 available to the user. This user may choose to retrieve the playback control record 62 created and submitted by the first user and use it to vary the playback of the same sensory work 18 recorded on his or her DVR.

CONCLUSION

We are inundated with sensory works 18. Much effort has been put in to identifying, locating, and accessing particular sensory works 18 (e.g., PVRs, Internet search technology, and the like); however, few processes are available to help one better process a particular sensory work 18. The techniques and systems described above are widely applicable to any sensory work 18, allowing a user, a company, or a community to create, use, and/or share metadata varying and/or controlling the playback of a sensory work 18.

A number of implementations have been described. Nevertheless, it will be understood that various modifications may be made without departing from the spirit and scope of the invention. Accordingly, other implementations are within the scope of the following claims.

What is claimed is:

1. A sensory work playback system, comprising:
a sensory work input port operable to receive sensory work data;
a storage device accessible over a network to members within a community for storing a playback control record that is selectable over the network by one or more members within the community setting forth alterations to the playback of the sensory work data, the playback control record including:
a sensory work applicability identifier usable to determine whether the playback control record is applicable to a sensory work;
a user rating, the user rating identifying the user's degree of like or dislike of the playback control record;
at least one variation encoding, the variation encoding including a control signal and data to define an alteration to be applied to the playback of the sensory work;
a sensory work output port operable to send information to a sensory output device to enable the playback of sensory work data;
a processor operable to automatically alter the playback of the sensory work data without user input in accordance with the playback control record based on the at least one variation encoding and the user rating of the playback control record, and to output altered sensory work data through the sensory work output port; and
a user interface enabling one or more members of the community to provide ratings feedback to the community.

2. The sensory work playback system of claim 1, wherein the sensory work data includes audio-visual information.

3. The sensory work playback system of claim 1, wherein the sensory work data is stored on a computer-readable medium.

4. The sensory work playback system of claim 3, wherein the computer-readable medium is removable.

5. The sensory work playback system of claim 1, wherein the sensory work input port is an input/output controller.

6. The sensory work playback system of claim 1, wherein the storage device is a memory.

7. The sensory work playback system of claim 1, wherein the sensory work output port is an input/output controller.

8. The sensory work playback system of claim 1, wherein the sensory work data may be used to playback the sensory work.

9. The sensory work playback system of claim 8, wherein the processor is operable to alter the playback of the sensory work data to skip at least one segment of the sensory work.

10. The sensory work playback system of claim 8, wherein the processor is operable to alter the playback of the sensory work data to reorder segments of the sensory work.

11. The sensory work playback system of claim 8, wherein the processor is operable to alter the playback speed of the sensory work data.

12. The sensory work playback system of claim 8, wherein the processor is operable to alter the playback of the sensory work data to insert a segment.

13. The sensory work playback system of claim 1, wherein the playback control record is represented as metadata.

14. The sensory work playback system of claim 1, wherein the sensory work playback system is a digital video recorder.

15. A playback control record stored on a non-transitory computer-readable medium, the playback control record comprising:
a sensory work applicability identifier usable to determine whether the playback control record is applicable to a sensory work;
a user rating, the user rating identifying the user's degree of like or dislike of the playback control record; and
at least one variation encoding, the variation encoding, including a control signal and data to define an alteration to be applied to the playback of the sensory work, wherein the playback control record is usable by a sensory work playback device to automatically alter the playback of the sensory work without user input based on at least the user rating of the playback control record.

16. The playback control record of claim 15, wherein the sensory work applicability identifier is hierarchical.

17. The playback control record of claim 16, wherein the sensory work applicability identifier includes a program identifier.

18. The playback control record of claim 17, wherein the sensory work applicability identifier further includes a source identifier.

19. The playback control record of claim 17, wherein the sensory work applicability identifier further includes a format identifier.

20. The playback control record of claim 15, wherein the frame of reference defines a reference occurrence.

21. The playback control record of claim 20, wherein the reference occurrence is a particular frame, the occurrence of which defines epoch time $t_0$.

22. The playback control record of claim 20, wherein the reference occurrence includes a frame sequence, the occurrence of which defines epoch time $t_0$.

23. The playback control record of claim 20, wherein the reference occurrence is a calculated value such that calculations may be performed using sensory work data and the results compared to the calculated value to identify epoch time $t_0$.

24. The playback control record of claim 15, wherein each of the at least one variation encoding includes:
 a temporal identifier relative to the frame of reference; and
 an alteration description.

25. The playback control record of claim 24, wherein the temporal identifier is a time t relative to the frame of reference.

26. The playback control record of claim 24, wherein the alteration description includes one or more from the group consisting of: a deletion; a reordering; an insertion; an overlay; a presentation; and a modification.

27. A method for altering the playback of a sensory work, the method comprising:
 receiving a playback control record, the playback control record including a sensory work applicability identifier usable to determine whether the playback control record is applicable to a sensory work, a user rating, the user rating identifying the user's degree of like or dislike of the playback control record, and at least one variation encoding, the variation encoding including a control signal and data to define an alteration to be applied to the playback of the sensory work;
 receiving the sensory work;
 automatically altering the sensory work based on the playback control record without user input based on at least the user rating of the playback control record; and
 outputting data to facilitate the playback of the altered sensory work by a sensory work playback device.

28. Software stored on a non-transitory computer-readable medium, the software comprising:
 a code segment to access a playback control record, wherein the playback control record includes a user rating, the user rating identifying the user's degree of like or dislike of the playback control record and at least one variation encoding, the variation encoding including control signals and data that defines an alteration to be applied to the playback of the sensory work;
 a code segment to read a sensory work;
 a code segment to automatically alter the sensory work based on at least the user rating of the playback control record without user input; and
 a code segment to output data to facilitate the playback of the altered sensory work by a sensory work playback device.

29. A device operable to control sensory work playback, the device comprising:
 a storage device for storing a playback control record setting forth alterations to the playback of a sensory work, the playback control record including:
  a user rating, the user rating identifying the user's degree of like or dislike of the playback control record;
  at least one variation encoding, the variation encoding including control signals and data for defining an alteration to be applied to the playback of the sensory work;
 logic for automatically generating at least one control signal based on at least the user rating of the playback control record without user input; and
 a control signal port operable to output the at least one control signal to vary the behavior of the sensory work playback device.

30. The device of claim 29, wherein each of the at least one variation encoding includes:
 a temporal identifier relative to the frame of reference; and
 an alteration description.

31. The device of claim 30, where the temporal identifier relative to the frame of reference is implicit.

32. The device of claim 30, wherein the alteration description includes:
 a control function; and
 a duration.

33. The device of claim 32, wherein the control function includes one or more from the group consisting of:
 play;
 stop;
 fast-forward;
 jump;
 rewind; and
 pause.

34. The device of claim 29, wherein the control signal port is operable to output the at least one control signal to vary the behavior of a sensory work playback device by sending infrared (IR) control signals.

35. On a server, a playback control record system comprising:
 a database of playback control records; and
 a playback control record retrieval system operable to transmit a playback control record from the database, the playback control record including a sensory work applicability identifier usable to determine whether the playback control record is applicable to a sensory work, a user rating, the user rating identifying the user's degree of like or dislike of the playback control record, and at least one variation encoding, the variation encoding including a control signal and data to define an alteration to be applied to the playback of the sensory work, wherein the playback control record is usable by a sensory work playback device to automatically alter the playback of the sensory work without user input based on at least the user rating of the playback control record.

36. The playback control record system of claim 35, further comprising a playback control record receiving system operable to receive playback control records and to store playback control records in the database.

37. A method for providing control of sensory work playback, the method comprising:
 storing at least one playback control record, wherein the at least one playback control record includes a user rating, the user rating identifying the user's degree of like or dislike of the playback control record, and at least one variation encoding, the variation encoding including a control signal and data that defines an alteration to be applied to the playback of a sensory work;
 receiving a playback control record request across a computer network;
 in response to the received request, submitting a playback control record from the at least one playback control record, the playback control record usable by a sensory work playback device to automatically alter the playback of the sensory work without user input based on at least the user rating of the playback control record; and
 maintaining metadata related to the at least one playback control record and using the maintained metadata to provide community features, the community features including recording feedback to the community.

38. The method of claim 37, wherein storing at least one playback control record setting forth alterations to the playback of a sensory work includes storing the at least one playback control record in a database.

39. The method of claim 38, wherein receiving a playback control record request across a computer network includes receiving a database query.

40. The method of claim 37, wherein submitting a playback control record from the at least one playback control record includes submitting a plurality of playback control records.

41. The method of claim 37, further comprising receiving a playback control record and storing the received playback control record with the at least one playback control record.

42. The method of claim 41, wherein the receipt and submission of playback control records is operable to provide a collaborative sensory work playback control system.

43. A method for providing control of sensory work playback, the method comprising:

storing at least one playback control record, wherein the at least one playback control record includes a user rating, the user rating identifying the user's degree of like or dislike of the playback control record, and at least one variation encoding, the variation encoding including a control signal and data that defines an alteration to be applied to the playback of a sensory work;

making the playback control record available to members within a community;

maintaining metadata related to the at least one playback control record and using the maintained metadata to provide community features, the community features including recording feedback to the community;

receiving a playback control record request across a computer network from one or more members of the community;

in response to the received request, submitting a playback control record from the at least one playback control record, the playback control record usable by a sensory work playback device to automatically alter the playback of the sensory work without user input based on at least the user rating of the playback control record.

* * * * *

UNITED STATES PATENT AND TRADEMARK OFFICE
CERTIFICATE OF CORRECTION

| | | |
|---|---|---|
| PATENT NO. | : 9,183,753 B2 | Page 1 of 1 |
| APPLICATION NO. | : 11/679059 | |
| DATED | : November 10, 2015 | |
| INVENTOR(S) | : Gary Zalewski | |

It is certified that error appears in the above-identified patent and that said Letters Patent is hereby corrected as shown below:

ON THE TITLE PAGE

Item (57), Line 6, insert --by-- before "any"

IN THE SPECIFICATION

Column 13, In line 11, delete "be"

Signed and Sealed this
Twenty-third Day of February, 2016

Michelle K. Lee
*Director of the United States Patent and Trademark Office*